United States Patent

[11] 3,574,883

[72] Inventors William James Brittain
 Southend, Essex;
 Jaan Lindre, Benfleet, Essex; Kenneth Stone, Chelmsford, Essex, England
[21] Appl. No. 846,122
[22] Filed July 30, 1969
[45] Patented Apr. 13, 1971
[73] Assignee Ford Motor Company
 Dearborn, Mich.
[32] Priority Dec. 31, 1968
[33] Great Britain
[31] 61796/68

[54] WINDSHIELD CLEANSING SYSTEM
 8 Claims, 11 Drawing Figs.
[52] U.S. Cl. .................................................. 15/250.02, 15/250.04
[51] Int. Cl. .................................................. B60s 1/46
[50] Field of Search .......................................... 15/250.02, 250.01, 250.03, 250.04; 239/(Inquired)

[56] References Cited
UNITED STATES PATENTS
| | | | |
|---|---|---|---|
| 3,114,168 | 12/1963 | Taylor | 15/250.02 |
| 3,147,504 | 9/1964 | Oishei | 15/250.02 |
| 3,209,384 | 10/1965 | P'Alba | 15/250.02 |
| 3,408,678 | 11/1968 | Linker | 15/250.05 |

Primary Examiner—Robert W. Jenkins
Attorneys—John R. Faulkner and John J. Roethel ABSTRACT: A windshield cleansing system utilizing a peristaltic pump device in which a roller mounted on an element of the windshield wiper operating linkage intermittently engages and rolls along a tube having resilient walls. The relationship of the roller and the tube are controllable so that the tube can be cyclically compressed by the roller to cause windshield wiper solvent to be pumped to and discharged from a washer jet. The cyclical compression of the tube and resultant discharge of the washer solvent is correlated with the movements of the wiper blades across the windshield surface.

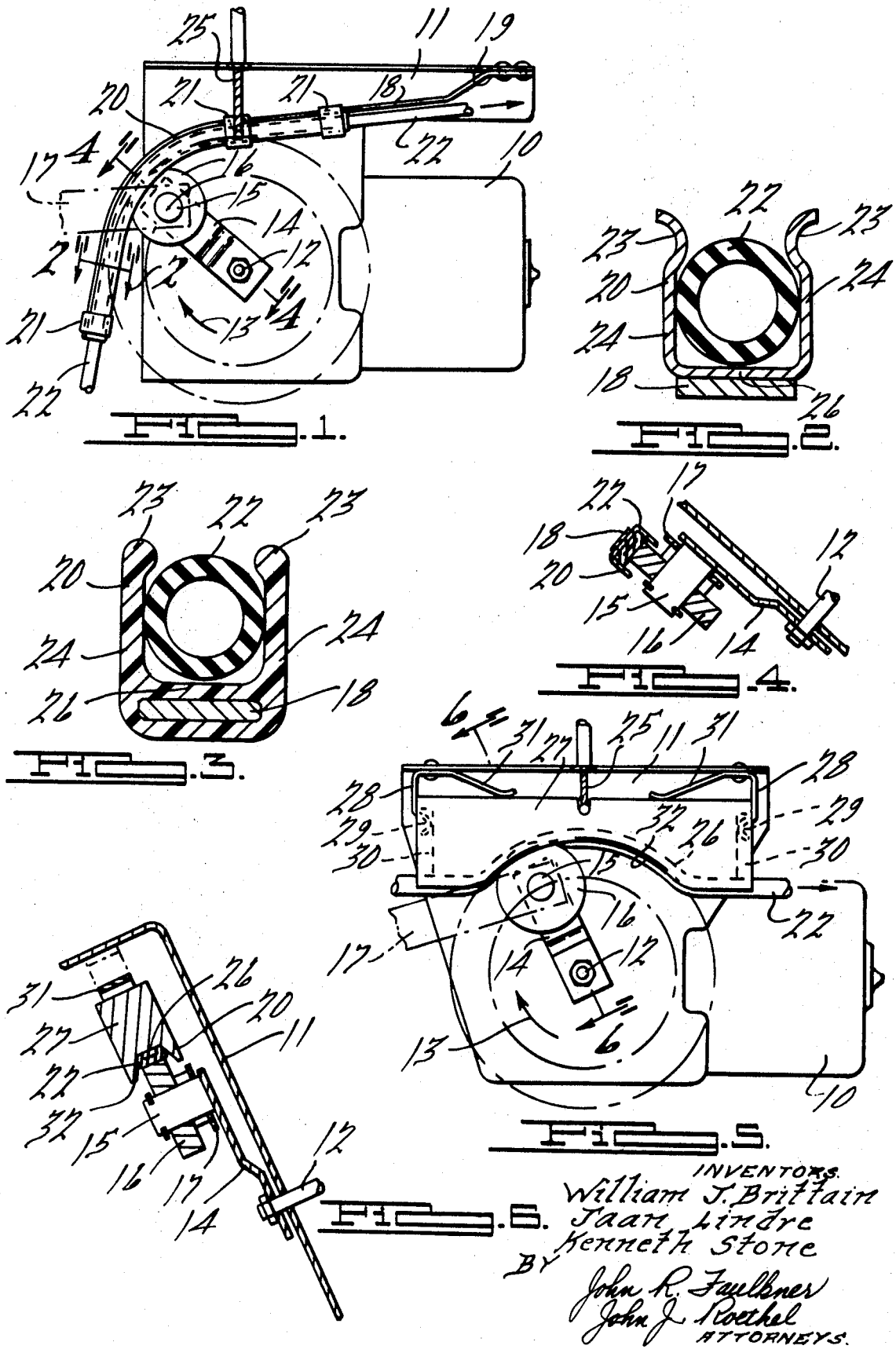

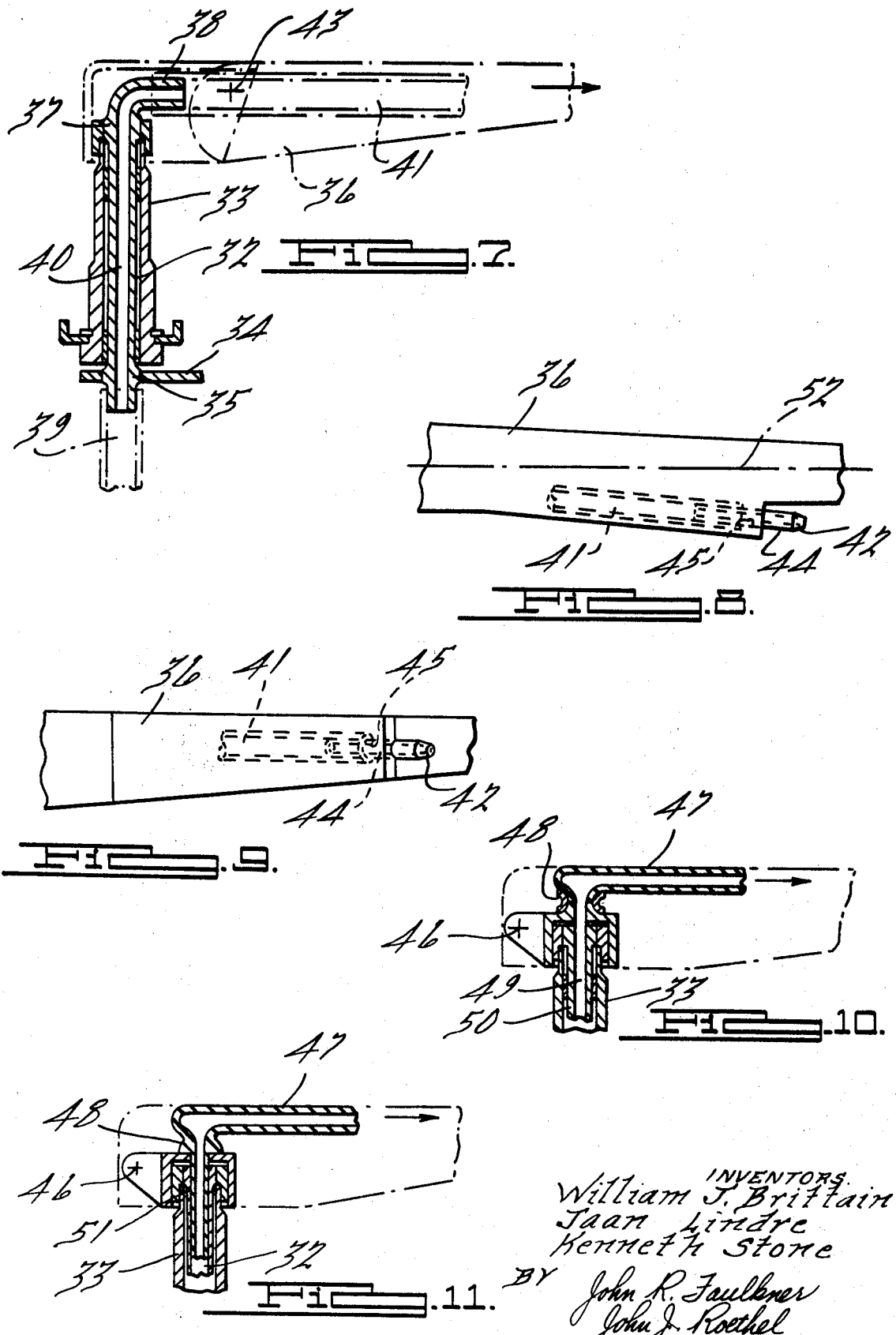

WINDSHIELD CLEANSING SYSTEM

BACKGROUND OF THE INVENTION

Peristaltic pumps which function by progressively compressing a tube along its length to force fluid therein toward a discharge outlet are known. Vehicle windshield washer pumps driven by the windshield wiper motor are also known. It is an object of the present invention to utilize the driving force of the windshield wiper motor to operate a peristaltic pump for supplying windshield wiper solvent to the vehicle windshield.

SUMMARY OF THE INVENTION

The windshield cleansing system embodying the present invention comprises a windshield wiper linkage operating motor and a peristaltic pump unit operable by the motor. The peristaltic pump unit has a resilient tube means coupled at its inlet end to a source of washer solvent and at its outlet to a washer jet directed at the windshield. The resilient tube is supported by a nonresilient backup member which preferably is a channel member encompassing a substantial portion of the tube means. A roller means is supported on a drive means coupled to said wiper linkage operating motor, said roller means being movable longitudinally of said tube means from the inlet toward the outlet end. The backup means for the resilient tube means and the roller means are supported for movement relative to one another into and out of a position in which the tube means is compressible against the backup means by the roller means as the latter moves therealong. The roller means cyclically compresses the tube means in predetermined relationship to the wiper linkage movement cycle to cause discharge of washer solvent through the washer jet in timed relationship to the movement of a wiper blade over the windshield.

DESCRIPTION OF THE DRAWINGS

Other objects, advantages and features of the present invention can be made more apparent as this description proceeds, reference being had to the accompanying drawings wherein:

FIG. 1 is a front elevation of a windshield wiper motor and a windshield washer pump driven by the wiper motor both forming part of a windshield cleaning system embodying the invention;

FIG. 2 is a cross section of the tube and channel of the pump shown in FIG. 1;

FIG. 3 is a cross section of an alternative form of channel;

FIG. 4 is a cross section along the line A–A of FIG. 1;

FIG. 5 is a front view of an alternative embodiment of the invention;

FIG. 6 is a cross section along the line B–B of FIG. 5;

FIG. 7 shows a wiper arm and shaft for the windshield cleaning system embodying the invention;

FIGS. 8 and 9 are detailed views illustrating the mounting of a jet on the wiper arm shown in FIG. 7; and FIGS. 10 and 11 show alternative wiper arms.

Referring to FIG. 1, an electric motor 10 is mounted on a base 11 fixed to the body structure (not shown) of a motor vehicle. The motor 10 drives a shaft 12 in the direction shown by the arrow 13. A crank 14 is fixed to the end of the shaft 12. A pivot stud 15 (see FIG. 4) is fixed at the outer end of the crank 14. A roller 16 and a connecting link 17 are journaled on the pivot stud 15.

The connecting link 17 drives a windshield wiper mechanism through a conventional linkage.

A leaf spring 18 is fixed at one end 19 to the base 11 and supports a channel 20 (see FIG. 2). The channel 20 is retained on the leaf spring 18 by clips 21.

A tube 22 of resiliently flexible material such as a polyvinylchloride plastic or rubber forms part of a liquid flow path between a liquid reservoir (not shown) and a jet (described below with reference to FIGS. 8 and 9). The tube 22 extends along the channel 20 and is retained in the channel by beads 23 along the walls 24 of the channel as shown in FIG. 2.

The leaf spring 18 biases the channel towards its operative position in which it holds the tube 22 in the path of the roller 16.

The channel 20 is of arcuate form so that in its operative position the base 26 of the channel acts as a backing member against which the tube is squashed by the roller 16 during part of each cycle of rotation of the roller 16 about the shaft 12. As the roller passes along the tube 22 it is guided by the walls 24 of the channel 20.

Each time the roller passes along the tube 22 it pumps a quantity of liquid from the reservoir towards the jet. This pumping action is assisted by nonreturn or check valves (not shown) in the liquid flow path between the reservoir and the tube 22 and between the tube 22 and the jet. Each check valve permits flow only in the direction from the reservoir to the jet.

A Bowden cable 25 connects the channel 20 to a windshield washer control operable by a driver of the vehicle to withdraw the channel to an inoperative position when the washer device is not required.

The spring 18 allows the channel to be displaced towards its inoperative position by the roller should liquid freeze in the tube.

The channel 20 may alternatively be constructed from moulded or extruded plastics material with the leaf spring 18 embedded within the moulding or extrusion as shown in FIG. 3.

An alternative pump construction is shown in FIGS. 5 and 6. A backing member 27 is guided for sliding movement relative to the base 11 by spring clips 28 formed with lugs 29 which slide in grooves 30 in each end of the backing member 27. Inwardly extending portions 31 of the spring clips 28 act against the upper edge of the backing member and bias it towards its operative position. The cable 26 is connected to the backing member.

The channel 20 is formed in the lower edge 32 of the backing member as shown in FIG. 6. The tube 22 may be secured by adhesive to the base 26 of the channel 20.

The jet or jets through which liquid is pumped may be of any conventional form mounted on the bonnet lid of the vehicle and directed at the windshield but a preferred construction and mounting of the jet together with a suitable form of liquid flow passage from the pump to the jet will be described below.

As shown in FIG. 7 a hollow shaft 32 is journaled in a bearing 33 fixed to the body structure of the vehicle. A crank arm 34 is fixed to the inner end 35 of the shaft 32 and connected by a conventional linkage to the crank 14 on the motor shaft 12. A wiper arm 36 is fixed to a splined portion 37 of the shaft 32 outside the body structure of the vehicle.

The shaft 32 is L-shaped so that an end portion 38 of the shaft is directed along the wiper arm.

A tube 39 is pushed over the inner end 35 of the shaft and supplies liquid from the pump to a passage 40 in the shaft 32. A tube 41 is pushed over the outer end portion 38 of the shaft 32 and connects the passage 40 to a jet 42 mounted in the wiper arm as shown in FIGS. 8 and 9. The tube 41 is flexible to permit articulation of the wiper arm about a pivot 43.

Referring now to FIGS. 8 and 9 the jet 42 is formed at the end of a tubular member 44 which extends through a bore 45 in the wiper arm 36. The tube 41 is pushed over the inner end of the tubular member 44.

As shown in FIG. 8 the jet 42 is offset from the centerline 52 of the wiper arm so that it discharges liquid onto the windshield of the vehicle at one side only of a wiper blade carried by the wiper arm 36. The position of the channel 20 of the pump is such that the liquid is pumped through the jet when the wiper arm is moving in the direction towards which the jet is offset so that liquid is discharged onto the windshield always in advance of the wiper blade.

An alternative form of wiper arm assembly is shown in FIG. 10 in which articulation of the wiper arm about a pivot 46 brings a suitably shaped tube 47 into contact with a seating 48 to establish a liquid flow path from a passage 49 in a shaft 50. A modification of this assembly is shown in FIG. 11 in which the seating 48 is formed at the end of a tube 51 which extends through the passage 49 in the shaft 50.

I claim:

1. A windshield cleansing system comprising:
   a windshield wiper linkage operating motor means;
   and a peristaltic pump unit coupled to said wiper linkage operating motor means;
   said peristaltic pump unit having a resilient tube means connected at its inlet end to a source of washer solvent and at its outlet end to a washer jet;
   backup means supporting said tube means;
   roller means;
   drive means coupled to said wiper linkage operating motor means supporting said roller means for movement longitudinally of said tube means from the inlet toward the outlet ends;
   support means supporting said backup means and said roller means for movement relative to one another into and out of a position in which the tube means is compressible against the backup means by the roller means as the latter moves therealong; and
   said roller means cyclically compressing said tube means in predetermined relationship to the wiper linkage movement cycle to cause discharge of washer solvent in timed relationship to the movement of a wiper blade over the windshield.

2. A windshield cleansing system according to claim 1, in which:
   the backup means for the resilient tube means is a channel-shaped member having a base wall and sidewalls;
   all of said walls coact to position the resilient tube; and
   the sidewalls coact to guide the roller means along the resilient tube.

3. A windshield cleansing system according to claim 2, in which:
   the backup means is spring-biased toward the position in which the resilient tube is compressible by the roller means.

4. A windshield cleansing system according to claim 3, in which:
   a remote control operator is coupled to the backup means to move the latter against the spring bias to an inoperative position in which the tube means is not compressible by the roller means.

5. A windshield cleansing system according to claim 1, in which:
   the backup means is a curved channel-shaped member having a base wall and sidewalls;
   all of said walls coact to locate the resilient tube means; and
   said sidewalls guide the roller means over the resilient tube means as the roller means compresses the tube means against the base wall.

6. A windshield cleansing system according to claim 5, in which:
   the curved channel-shaped member is supported on a leaf spring and is biased toward the position in which the resilient tube is compressible by the roller means.

7. A windshield cleansing system according to claim 6, in which:
   a remote control operator is coupled to the channel-shaped member to move the latter against the bias of the leaf spring to a position in which the tube means is not compressible by the roller means.

8. A windshield cleansing system according to claim 5, in which:
   the drive means comprises a crank secured at one end to a shaft of the motor means;
   pivot means on the other end of said crank is adapted to connect the crank to other components of the wiper linkage; and
   the roller means is rotatable on said pivot means;
   said roller means being swingable into and out of contact with said resilient tube means as the crank rotates about the shaft of the motor means.